United States Patent [19]

Flatau

[11] Patent Number: 4,563,318
[45] Date of Patent: Jan. 7, 1986

[54] POLYVINYL CHLORIDE MOLDING COMPOSITION, A PROCESS FOR ITS PRODUCTION, AND ITS USE

[75] Inventor: Karsten Flatau, Haltern, Fed. Rep. of Germany

[73] Assignee: Huels Aktiengesellschaft, Marl, Fed. Rep. of Germany

[21] Appl. No.: 641,933

[22] Filed: Aug. 20, 1984

Related U.S. Application Data

[63] Continuation of Ser. No. 406,430, Aug. 9, 1982, abandoned.

[30] Foreign Application Priority Data

Aug. 10, 1981 [DE] Fed. Rep. of Germany ....... 3131609

[51] Int. Cl.$^4$ ..................... C08L 25/14; C08L 27/06; C08J 5/18
[52] U.S. Cl. .................... 264/119; 264/126; 264/175; 525/227
[58] Field of Search ......................... 525/227; 264/119

[56] References Cited

U.S. PATENT DOCUMENTS

| 2,868,763 | 1/1959 | Montgomery | 525/227 |
|---|---|---|---|
| 3,859,384 | 1/1975 | Carty et al. | 525/228 |
| 3,859,389 | 1/1975 | Carty et al. | 525/228 |
| 4,051,200 | 9/1977 | Simak et al. | 525/227 |
| 4,086,296 | 4/1978 | Carty et al. | 525/309 |

FOREIGN PATENT DOCUMENTS

| 2624656 | 12/1977 | Fed. Rep. of Germany . | |
| 55-029567 | 3/1980 | Japan . | |
| 430119 | 1/1975 | U.S.S.R. | 525/227 |

*Primary Examiner*—Carman J. Seccuro
*Attorney, Agent, or Firm*—Millen & White

[57] ABSTRACT

A polyvinyl chloride molding composition, suitable for the manufacture of sheet stock according to the "Luvitherm" method, consists essentially of emulsion polyvinyl chloride and 0.5–3.0% by weight of a processing aid which is a copolymer of 40–90% by weight of vinyl monomers whose corresponding homopolymers have a glass point below 0° C., and of 10–60% by weight of vinyl monomers whose corresponding homopolymers have a glass transition temperature above 20° C.

4 Claims, No Drawings

POLYVINYL CHLORIDE MOLDING COMPOSITION, A PROCESS FOR ITS PRODUCTION, AND ITS USE

This application is a continuation of application Ser. No. 406,430 filed Aug. 9, 1982, now abandoned.

BACKGROUND OF THE INVENTION

The manufacture of polyvinyl chloride sheet stock according to the "Luvitherm" method is conventional. (See, e.g., "Kunststoff Handbuch" [Plastics Manual] vol. II, Carl Hanser Publishers, Munich, 1963, part 1, pp. 140 et seq., whose disclosure is incorporated by reference herein). The compounded PVC mass is calendered at relatively low temperatures (150°-190° C.)., i.e. is press-molded into a sheet by means of rolls; this sheet is not as yet thoroughly plasticized. In a second stage, the sheet, having only minor mechanical strength, is sintered by a short-term treatment as elevated temperatures and, in a further stage, it is refined by stretching.

Unmodified PVC can be processed only at low take-off speeds. It is desirable for economic reasons to increase the processing speed in the sheet manufacture of emulsion polyvinyl chloride according to the "Luvitherm" method without simultaneously impairing quality, and in particular, surface refinement, of the sheet stock.

The addition of small amounts of acrylate or methacrylate polymers has proved to be advantageous for improving the processability of polyvinyl chloride in general. Thus, it is known to utilize, as calendering aids, graft copolymers consisting of an elastomeric, non-crosslinked acrylic ester polymer as the graft base and methyl methacrylate, an acrylate and/or styrene as the grafting branch (DOS No. 2,135,024). However, the processability of emulsion polyvinyl chloride by the "Luvitherm" method cannot be improved with such graft copolymers according to the state of the art. See, e.g., DAS No. 2,624,656, column 2, lines 18-21.

DAS No. 2,624,656, on the other hand, describes mixed graft polymers which are characterized as suitable processing aids (modifiers) for vinyl chloride polymers to be used in the "Luvitherm" process. These mixed graft polymers are of a comparatively complicated structure and thus can be produced only with relatively great expenditures.

SUMMARY OF THE INVENTION

Accordingly, it is an object of this invention to provide polyvinyl chloride molding compositions suitable for processing in accordance with the "Luvitherm" method and containing a small amount of a processing aid (modifier) of a simple structure and easy to manufacture, and wherein the modifier is initially contained in the polyvinyl chloride and need not be admixed therewith later on, prior to processing.

It is another object of this invention to provide sheet stock obtained from this polyvinyl chloride molding composition which is producible (processable) at a high rate, and, in spite of the high processing speed, exhibits a very high quality, in particular a glossy and smooth surface.

Upon further study of the specification and appended claims, further objects and advantages of this invention will become apparent to those skilled in the art.

These objects have been attained by this invention by providing a polyvinyl chloride molding composition, a process for its production, and its use.

The polyvinyl chloride molding composition of this invention, suitable for the manufacture of sheet stock according to the "Luvitherm" method, consists essentially of emulsion polyvinyl chloride and 0.5-3.0% by weight of a processing aid which is a copolymer of 40-90% by weight of vinyl monomers whose corresponding homopolymers have a glass point below 0° C., and of 10-60% by weight of vinyl monomers whose corresponding homopolymers have a glass transition temperature above 20° C.

DETAILED DISCUSSION

Herein, emulsion polyvinyl chloride is understood to include both homo- and copolymers of vinyl chloride prepared by emulsion polymerization. Preferably, the homopolymers of vinyl chloride have a K-value of 70-85, especially 75-83 (DIN 53 736). The emulsion copolymers of vinyl chloride can contain up to 30% by weight, preferably up to 15% by weight, of the usual other monomers copolymerizable with vinyl chloride, such as vinyl acetate or vinylidene chloride. The homopolymers of vinyl chloride are generally preferred. Suitable such polymers are discussed in many publications such as the Kainer reference cited below.

The emulsion polyvinyl chloride to be used in accordance with this invention is produced by polymerizing the monomers in an aqueous emulsion according to customary and fully conventional procedures. Polymerization can be effected continuously or discontinuously, in general at temperatures ranging from 30° to 75° C. in the presence of water-soluble initiators with the concomitant use of the customary additives and auxiliary agents, e.g. emulsifiers. The processes for emulsion polymerization of vinyl chloride, as well as the various aids and catalysts used therein are also described in detail in many publications, e.g. in the monograph by H. Kainer, "Polyvinylchlorid and Vinylchlorid-Mischpolymerisate" [Polyvinyl Chloride and Vinyl Chloride Copolymers], Springer Publishers (1965), pp. 34-59, whose disclosure is incorporated by reference herein.

The polyvinyl chloride molding compositions of this invention generally contain 0.5-3% by weight, especially 0.8-2.0% by weight, based on the weight of the entire molding composition, of the mentioned copolymers as the processing aids. Additionally, the molding composition can also contain the usual additives, such as customary mold release agents, stabilizers, blowing agents, fillers, pigments, and the like, in the usual fully conventional amounts, e.g. 3.3-25.0 wt. %. Preferably, plasticizer-free vinyl chloride polymers are utilized and processed into hard sheet rock. The remainder of the composition, of course, is the polyvinyl chloride polymer.

The processing aids are copolymers composed of 40-90% by weight, preferably 60-80% or 50-70% by weight, of vinyl monomers whose corresponding homopolymers have a glass point below 0° C., such as, for example, acrylic acid esters of 4-12 carbon atoms in the alcohol portion (e.g., $C_{4-10}$alkyl) and the like. Among these are, inter alia, acrylic acid butyl ester, acrylic acid hexyl ester, octyl acrylate, acrylic acid 2-ethylhexyl ester, acrylic acid decyl ester, acrylic acid lauryl ester and the like. The processing aid copolymers furthermore are composed of 10-60% by weight, preferably 30-50% or 20-40% weight, of vinyl monomers whose corresponding homopolymers have a glass point above 20° C., such as, for example, styrene, α-methylstyrene, vinyl chloride, acrylonitrile and the like.

It is exceedingly surprising that acrylate polymers have been discovered to be suitable for the purpose described herein since it is expressly recommended in DAS 2,624,656, column 2, lines 18–21, to refrain from the use of acrylate polymers as processing aids for polyvinyl chloride in the "Luvitherm" method.

The processing aid copolymers can be prepared by fully conventional emulsion polymerization techniques according to batch or continuous-feed methods in the presence of the conventional emulsifiers, initiators, and, optionally, other polymerization auxiliaries customary in emulsion polymerization, at temperatures usually of 60° to 80° C. Such polymerization processes are described, e.g., in F. Hölscher, "Dispersionen synthetischer Hochpolymerer" [Dispersions of Synthetic High Polymers] part I, "Eigenschaften, Herstellung, Prüfung" [Properties, Manufacture, Testing], Springer Publishers, 1969, whose disclosure is incorporated by reference herein.

The latices usually have solids contents of 20–50%, preferably 30–45%. The latex particles usually have a shell-type construction or contain the vinyl monomers in uniform distribution. The shell structure, as is known, is conventionally obtained by stepwise polymerization.

The copolymers are generally used in amounts of 0.5–3% by weight, based on the amount of polyvinyl chloride. The copolymer latices can be mixed with the polyvinyl chloride latex. The resultant dispersion mixture with the two polymers can then be jointly processed under conditions fully conventional for the drying of emulsion polyvinyl chloride dispersions, for example by passing the mixture through nozzles, to obtain a flowable, modified emulsion polyvinyl chloride. Fully conventional considerations apply to these mixing and drying procedures.

The amount of processing aid can be subsequently varied. For example, starting with a product having a higher content of copolymers, the emulsion polyvinyl chloride composition of this invention can be blended with additional unmodified emulsion polyvinyl chloride. Thus, the processor can subsequently adjust the optimum amount of processing aid depending on the processing conditions prevailing and/or desired, e.g., in view of routine preliminary experiments.

Unless specified otherwise herein, all details of the PVC molding compositions, their preparation, their use to prepare sheet stock, etc., are fully conventional, e.g., as disclosed in Kainer, 1965, page 348/349. whose disclosures are incorporated by reference herein.

The sheet stock of this invention is useful for all the conventional uses of corresponding PVC sheet stock of the prior art, e.g., for packing up or winding about cables.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples all temperatures are set forth uncorrected in degrees Celsius; unless otherwise indicated, all parts and percentages are by weight.

EXAMPLE I

Preparation of a Copolymer Latex (Processing Aid)

A 150-liter polymerization reactor is charged with 73.5 kg of water, 2% (based on the monomer mixture) of $C_{14/15}$-alkyl sulfonate as emulsifier, and 0.2% (based on monomer mixture) of potassium persulfate as initiator.

The reactor, heated to 60° C., is charged uniformly with a monomer mixture of 9.9 kg of styrene and 23.1 kg of butyl acrylate.

A copolymer latex results having 30% solids content.

EXAMPLE 2

Preparation of an Emulsion Polyvinyl Chloride

An autoclave equipped with jacket cooler and paddle stirrer and having a capacity of 13 m$^3$ is charged, per hour, with: about 776 kg of vinyl chloride, 690 l of an aqueous solution containing 2% by weight of an alkanesunfonate (alkyl chains containing 10–18 carbon atoms, 15 carbon atoms on the average) and 2 kg of phosphoric acid, 24 l of a 0.25% by weight aqueous hydrogen peroxide solution (about 0.008% by weight, based on vinyl chloride), and 24 l of a 0.1% by weight aqueous ascorbic acid solution (0.003% by weight, based on vinyl chloride); the degree of filling is, as usual, about 90%. The pH is 6.3. The polymerizing temperature is maintained at 50° C. Conversion is about 91% by weight. A stable dispersion is thus obtained having a solids content of about 45%.

EXAMPLE 3

Preparation of a Polyvinyl Chloride Molding Composition 500 kg of the thus-prepared alkaline-prestabilized polyvinyl chloride dispersion, containing 45% by weight solids, was blended with 15 kg of the aforedescribed copolymer latex. The dispersion mixture was worked up into a flowable product by spray-drying. The molding composition contains 2.0% by weight of the copolymer.

The dimensional stability under heat and the thermostability of the modified emulsion polyvinyl chloride are not altered in comparison with the corresponding properties of the unmodified emulsion polyvinyl chloride. The product has a K-value of 78.

EXAMPLE 4

Processing Test

A polyvinyl chloride composition consisting of
100 parts of weight of polyvinyl chloride molding composition prepared according to the above process,
0.7 parts by weight of stabilizer,
4 parts by weight of wax
is processed on a processing unit corresponding to the prior art, as described in H. Sachtling, "Kunststoff-Taschenbuch" [Plastics Pocketbook], Carl Hanser Publishers, 1979, p. 161–245, whose disclosure is incorporated by reference herein, to prepare polyvinyl chloride sheet stock according to the "Luvitherm" method. The unit consists of a calender, a "Luvitherm" station with take-off rolls and a stretching station.

Take-off speeds of 120–130 m/min, after the stretching station, are attained at the temperature program customary for the production of "Luvitherm" sheets (Saechtlich, "Kunststoff-Taschenbuch", Carl Hanser Publishers, 1979, p. 245). If unmodified polyvinyl chloride is used in the same way, take-off speeds of 90–100 m/min (after the stretching station) are obtained. In other words, the processing speed is raised by more than 20% by means of the modification according to this invention. This is most highly surprising, inasmuch as, according to DAS No. 2,624,656, column 2, lines 18–21, the use of acrylate polymers as processing aids for emulsion polyvinyl chloride for the "Luvitherm" process is expressly discouraged.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the Luvitherm method for preparing polyvinyl chloride sheet stock comprising calendering a polyvinyl chloride molding composition at a low temperature into sheet stock using rollers, thereby obtaining a sheet having low mechanical strength, then sintering the latter at a higher temperature for a short time, and thereafter stretching the film, the improvement wherein the polyvinyl chloride molding composition consists essentially of, as processing aid, 0.5–3.0% by weight of a simple copolymer consisting essentially of 40–90% by weight of vinyl monomers whose corresponding homopolymers have a glass temperature below 0° C. and of 10–60% by weight of styrene; and the balance being emulsion polyvinyl chloride;

wherein, in the processing aid copolymer, the monomer with a glass temperature below 0° C. is an acrylic acid ester whose esterifying moiety is a $C_{4-12}$-alkyl group.

2. A method of claim 1 wherein the polyvinyl chloride molding composition consists of said processing aid and emulsion polyvinyl chloride.

3. A method of claim 1 wherein in the polyvinyl chloride molding composition, the processing aid copolymer consists essentially of 60–80% by weight of said monomers whose corresponding homopolymers have a glass transition temperature below 0° C. and of 20–40% by weight of styrene.

4. A method of claim 1 wherein in the polyvinyl chloride molding composition, the processing aid copolymer consists essentially of 50–70% by weight of said monomers whose corresponding homopolymers have a glass transition temperature below 0° C. and of 30–50% by weight of styrene.

* * * * *